United States Patent
Lee

(10) Patent No.: US 6,629,259 B2
(45) Date of Patent: *Sep. 30, 2003

(54) METHOD FOR AUTOMATICALLY DUPLICATING A BIOS

(75) Inventor: Hsin-Yi Lee, Taipei Hsien (TW)

(73) Assignee: Micro-Star International Co., Ltd., Taipei Hsien (TW)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,136

(22) Filed: Aug. 9, 1999

(65) Prior Publication Data

US 2003/0126493 A1 Jul. 3, 2003

(30) Foreign Application Priority Data

May 11, 1999 (TW) .......................... 88107577 A

(51) Int. Cl.⁷ ................................ G06F 11/00
(52) U.S. Cl. .................... 714/2; 713/1; 713/2
(58) Field of Search ................. 714/6, 3, 2; 713/2, 713/1, 100; 717/168

(56) References Cited

U.S. PATENT DOCUMENTS

| | | | | |
|---|---|---|---|---|
| 5,473,775 A | * | 12/1995 | Sakai et al. | 713/2 |
| 5,522,076 A | * | 5/1996 | Dewa et al. | 713/2 |
| 5,793,943 A | * | 8/1998 | Noll | 714/6 |
| 6,308,265 B1 | * | 10/2001 | Miller | 710/10 |
| 6,317,827 B1 | * | 11/2001 | Cooper | 713/2 |
| 2001/0056532 A1 | * | 12/2001 | Cooper | 713/2 |

* cited by examiner

*Primary Examiner*—Robert Beausoliel
*Assistant Examiner*—Marc Duncan
(74) *Attorney, Agent, or Firm*—Troxell Law Office PLLC

(57) ABSTRACT

A method for automatically duplicating a BIOS, wherein in a variable memory, other than the general used space for storing system BIOS, a further space is programmed for storing the program code of a backup BIOS, when the loading of a system BIOS fails, the system will try to load the duplicate BIOS in order to prevent that the BIOS is malfunctioned by mistake of the user. Therefore, the maintenance cost is reduced and the system may be operated normally.

3 Claims, 4 Drawing Sheets

METHOD FOR AUTOMATICALLY DUPLICATING A BIOS

FIELD OF THE INVENTION

The present invention relates to a method for automatically duplicating a BIOS in order to prevent that the BIOS is malfunctioned by mistake of the user. Therefore, the maintenance cost is reduced and the system may be operated normally.

BACKGROUND OF THE INVENTION

In a general computer, a BIOS (BASIC INPUT OUPOT SYSTEM) is an set of instructions stored in a read only memory (ROM), which serves to instruct the communication between the hardware of a computer, the operating system, the application program and the peripheral devices. Since in the early computer, a read only memory is employed, since it is nonvolatile, a user can not modify and update the contents of a BIOS. However, nowadays, variable memories (such as FLADH ROM MEMOTY, EEPROM, FIRMWARE HUB) are widely used, after a computer is actuated, the BIOS is loaded into the variable memory and then it is performed. Thus, the BIOS can be updated and then the new edition of the BIOS is retained. But it is probably that the BIOS is updated by mistakes. Therefore, as the computer is re-actuated, the computer will not be operated normally. In general, a disk is sent to the buyer as he (or she buys a mother board). The disk is the updating disk of BIOS for updating the BIOS as it is abnormal. However, most of the user does not fully understand this function so to search other seller for maintaining the computer This is not only time-consuming, but also is costly both for the buyer and seller.

SUMMARY OF THE INVENTION

Accordingly, the primary object of the present invention is to provide a method for automatically duplicating a BIOS, wherein in a variable memory, other than the general used space for storing system BIOS, a further space is programmed for storing the program code of a backup BIOS, when the loading of a system BIOS fails, the system will try to load the duplicate BIOS in order to prevent that the BIOS is malfunctioned by mistake of the user. Therefore, the maintenance cost is reduced and the system may be operated normally.

According to the aforementioned description, when the system BIOS is loaded normally, the space for storing BIOS program code will store the system BIOS program code, or original code of a BIOS of other edition as a backup BIOS. After a computer is actuated, at first, the system BIOS is loaded. If it is failed, the backup BIOS is tried to be loaded so that even a computer is destroyed, it still may be operated.

The various objects and advantages of the present invention will be more readily understood from the following detailed description when read in conjunction with the appended drawing.

DETAILED DESCRIPTION OF THE PREFERRED EMBODIMENTS

Figure 1:
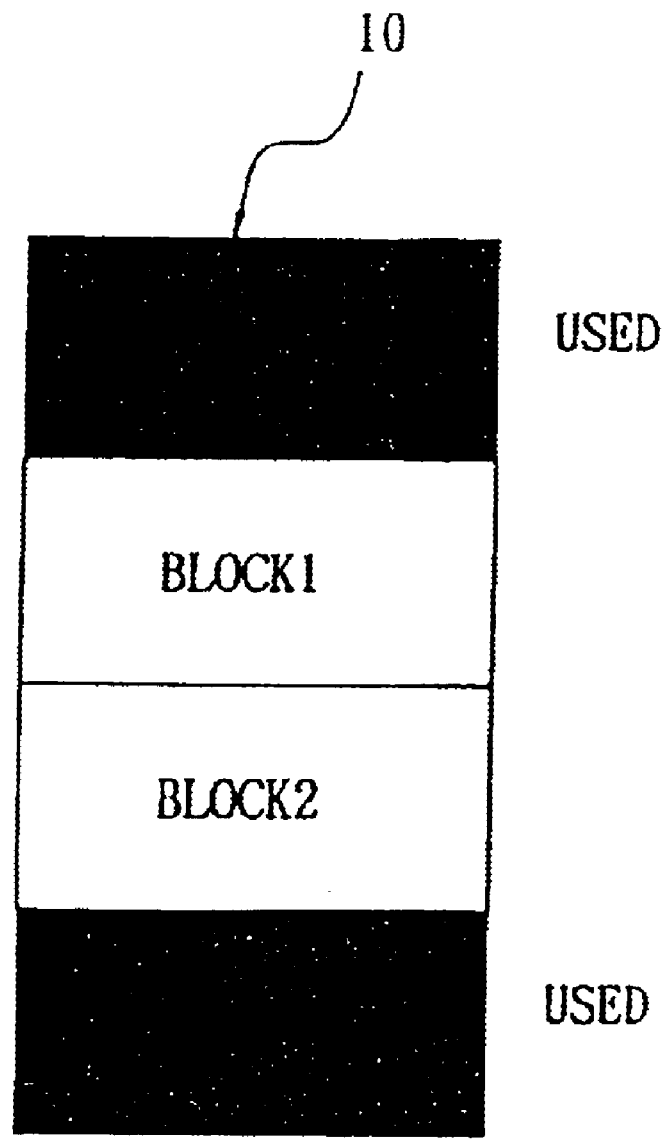
FIG. 1 is a schematic view of a variable memory.

As shown in FIG. 1, a schematic view of the variable memory is illustrated. In the present invention, a variable memory 10 (such as FLASH ROM MEMORY, EEPROM, FIRMWARE HUB) serves as an element for storing BIOS. The variable memory is divided into a plurality of blocks. Each block is programmed for storing program codes of different functions (for example, ESCD, BMI, BOOT BLOCK), and two spaces are left as BLOCK1 and BLOCK2 (in this embodiment, they may have a size of 64K, 128K, or 256K dependent on the specification of hardware or software). The space of BLOCK2 has been stored in the system BIOS as the mother board is fabricated, another BLOCK1 serves as a spare space for storing a copy of BIOS.

Figure 2:
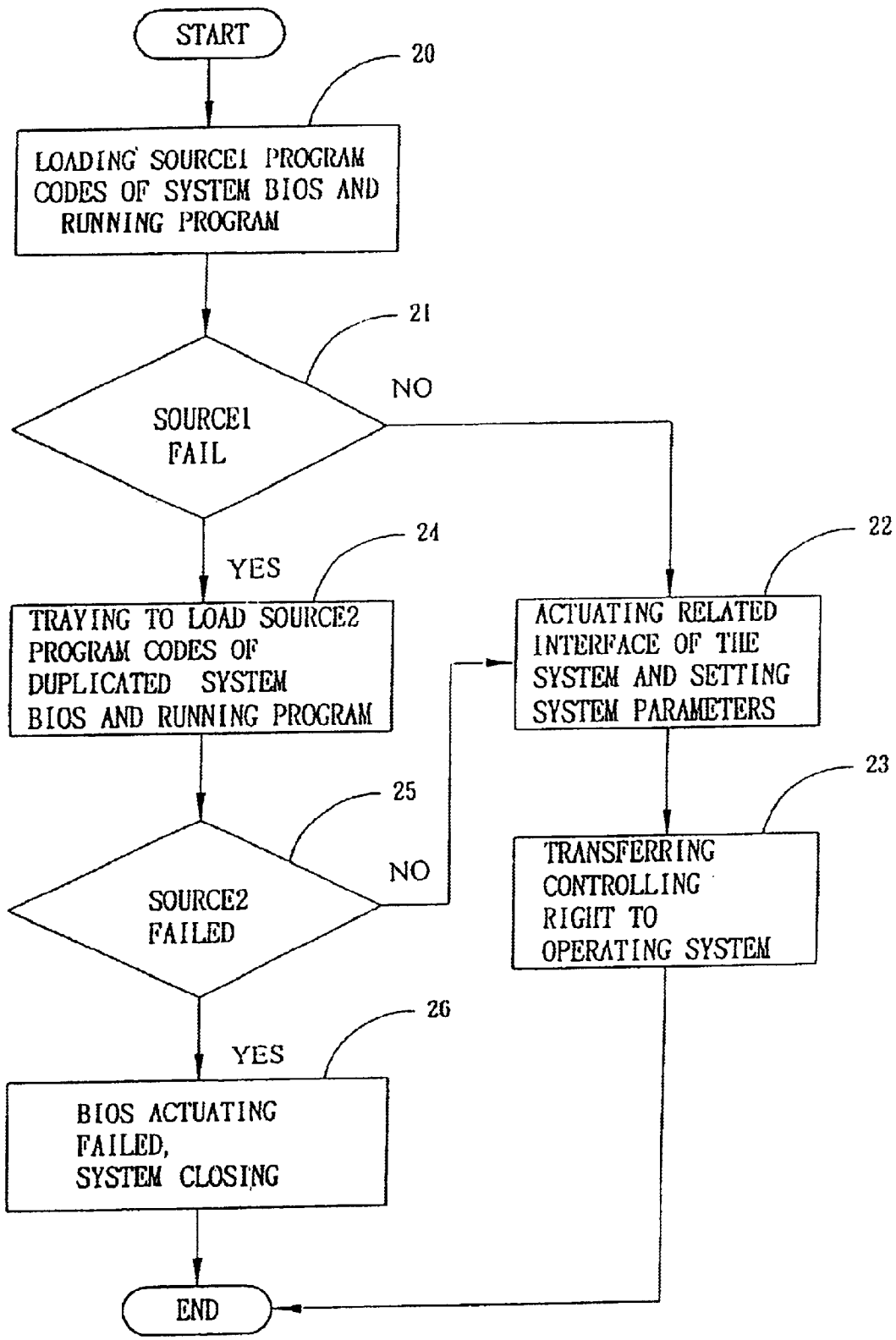
FIG. 2 is a flow diagram of the present invention.

As shown in FIG. 2, the block flow diagram of the present invention is illustrated. Then the computer is actuated first time, the system BIOS stored in the BLOCK2 (referring as SOURCE1) is firstly loaded the program codes itself into BLOCK 1 (referring as SOURCE2) as a backup copy. Then when the computer is reactuated, by the setting of a program, the SOURCE1 will not duplicate BIOS so as to maintain the completeness of the program code of SOURCE2.

After the computer is actuated, the program code of SOURCE1 is loaded (step 20), then the process determines whether the loading of SOURCE1 is successful. If yes, then the process is operated normally, the related interface in the system is actuated and the system parameter is set (step 22), and then the control right is transferred to the operating system (step 23), thus the actuation of a computer is completed. If no, the program code of SOURCE2 is tried to be loaded (step 24).If yes, the aforementioned processes are performed again, and then the operating system is actuated (steps 22 and 23), and then the process determines whether the loading of SOURCE2 is successful (step 25). If no, the system function is shut down (step 26), then the failure of loading BIOS is displayed for informing the user.

Figure 3:
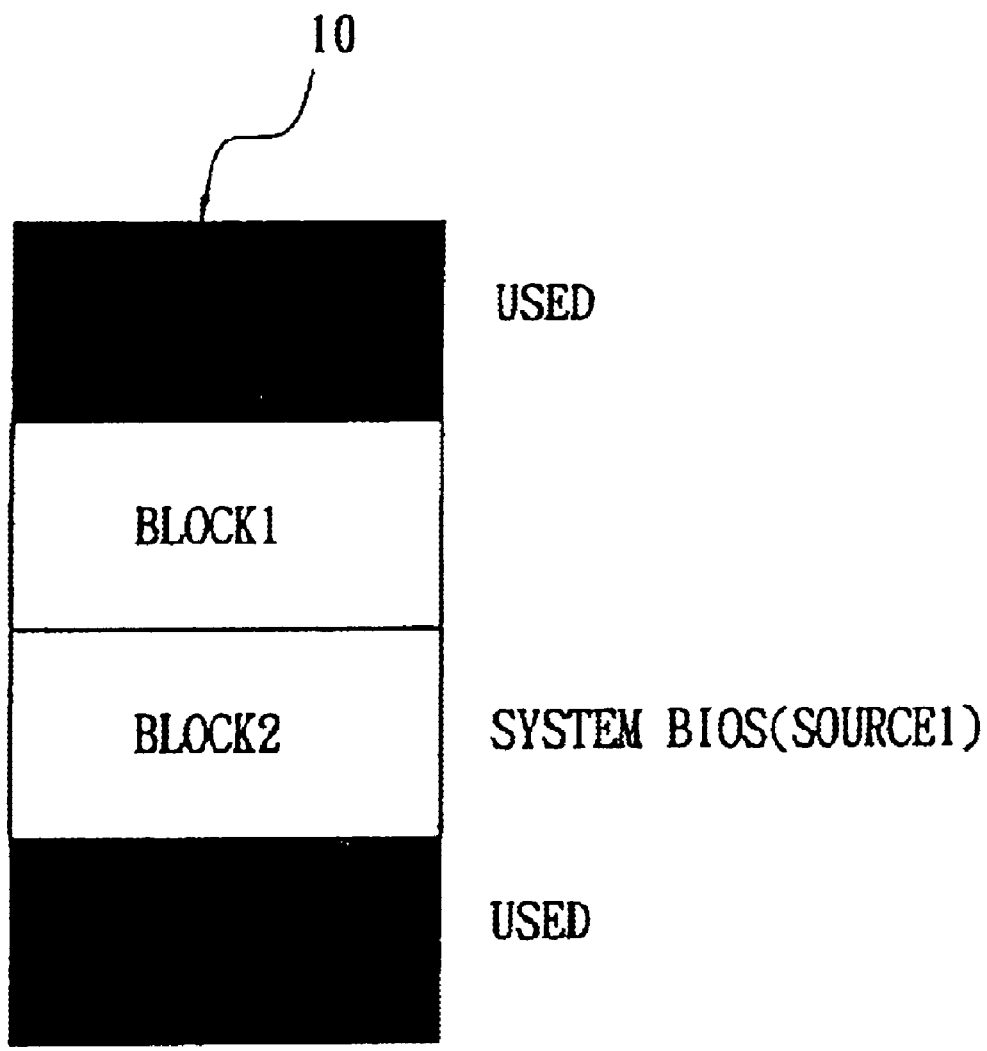
FIG. 3 shows the arrangement of the variable memory according to the present invention.
Figure 4:
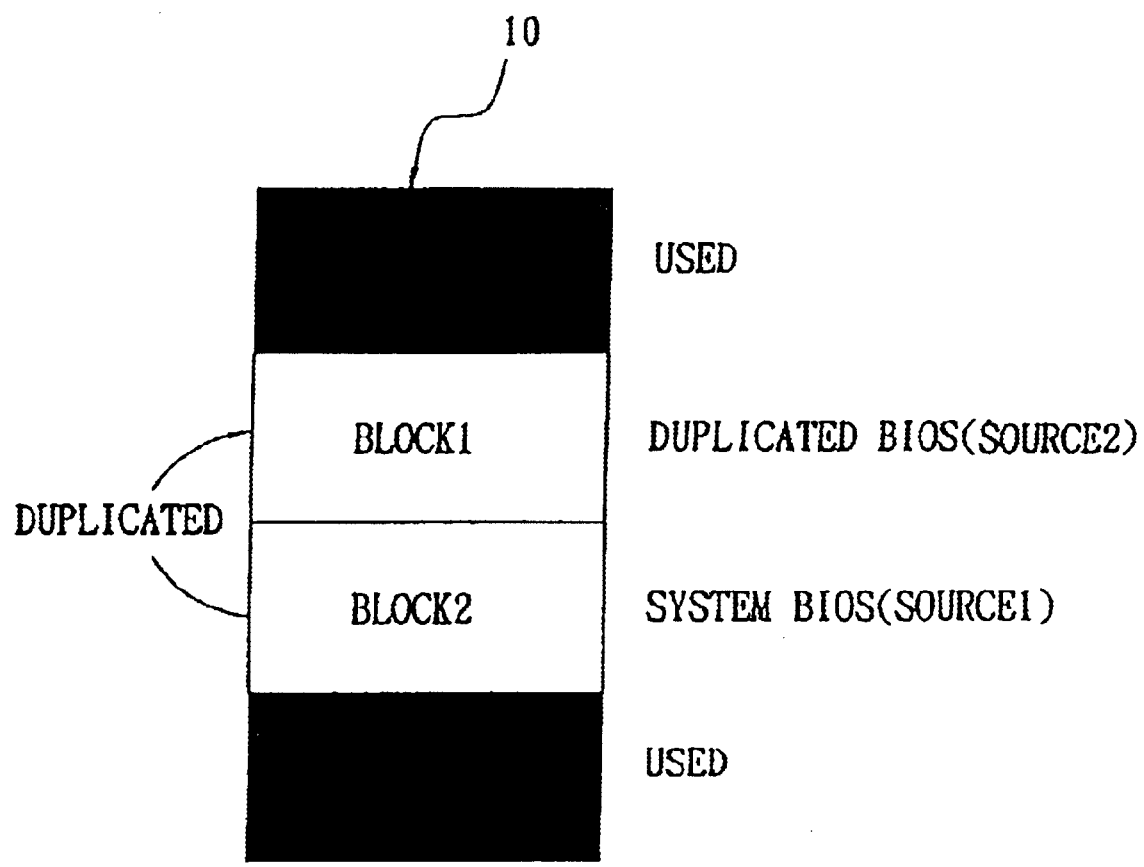
FIG. 4 is a schematic view showing the arrangement that variable memory of the present invention serves to update or duplicating a BIOS.

In order that the aforementioned function is normally operated, in the present invention, an application program is provided in the operating system for updating and maintaining the SOURCE1 and SOURCE2. As shown in FIG. 3, during the process of using an application program to update and maintain the BIOS, the new edition BIOS will be firstly stored in the BLOCK2 (referring as SOURCE1). After updating, the first actuation of the computer is re-actuated. Similarly, the program code of SOURCE1 is copied to BLOCK1 as the program code of SOURCE2 (as shown in FIG. 4). Therefore, according to the aforementioned steps, when the loading operation is normal, the computer will derive stronger functions according to the new edition BIOS. When SOURCE1 fails, the backup SOURCE2 program code still serves to maintain the normality of starting up. Thus, a user has another protection.

In summary, by the automatic duplicating BIOS method of the present invention, the problem that the original BIOS is modified carelessly so that the computer can not be started up is solved. Therefore, the user may save much cost in maintenance. And, the service of the solder after sold is reduced.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for setting up a computer and automatically duplicating a BIOS, said method comprising the steps of:

(a) providing a programmable memory in said computer, said programmable memory having a first block of memory and a second block of memory;

(b) loading program codes of said BIOS into only said first block of memory prior to initial computer set up;

(c) copying program codes of said BIOS in said first block of memory into said second block of memory only during first time set up of the computer;

(d) loading the program codes of said BIOS from said first block of memory into the computer for execution;

(e) loading the program codes of said BIOS from said second block of memory for execution only if said loading in said step (d) fails;

(f) terminating said method if said loading in said step (e) fails; and (g) actuating a related interface of said computer, setting system parameters and transferring control of said computer to an operating system.

2. The method as claimed in claim 1, said method further comprising an update procedure for updating said BIOS with a new revision, said update procedure including:

(h) loading program codes of said new revision of said BIOS only into said first block of memory; and (i) copying program codes of said BIOS from said first block of memory into said second block of memory only during a next computer set up.

3. The method as claimed in claim 1, wherein said programmable memory is selected from a group consisting of a Flash ROM memory, an EEPROM memory, and a firmware hub.

* * * * *